(12) United States Patent
Wallner et al.

(10) Patent No.: US 8,696,781 B2
(45) Date of Patent: Apr. 15, 2014

(54) EXPANDED METAL AND PROCESS OF MAKING THE SAME

(75) Inventors: Michael H. Wallner, Rancho Cucamonga, CA (US); Paul Wallner, Alta Loma, CA (US)

(73) Assignee: Wallner Tooling\Expac, Inc., Rancho Cucamonga, CA (US)

( * ) Notice: Subject to any disclaimer, the term of this patent is extended or adjusted under 35 U.S.C. 154(b) by 826 days.

(21) Appl. No.: 12/891,606

(22) Filed: Sep. 27, 2010

(65) Prior Publication Data

US 2011/0067372 A1 Mar. 24, 2011
US 2012/0144792 A2 Jun. 14, 2012

Related U.S. Application Data

(60) Provisional application No. 61/246,943, filed on Sep. 29, 2009.

(51) Int. Cl.
*B01D 46/00* (2006.01)

(52) U.S. Cl.
USPC .................. 55/486; 55/487; 55/497; 55/501; 55/525

(58) Field of Classification Search
USPC .......................... 55/521, 525–526, 490–519; 428/496–497, 596–597; 29/6.1–6.2; 442/6–29; 95/273–287; 210/483–510.1
See application file for complete search history.

(56) References Cited

U.S. PATENT DOCUMENTS

| 2,201,756 | A | | 5/1940 | Avetta |
| 4,268,289 | A | | 5/1981 | Polaner |
| 5,461,761 | A | * | 10/1995 | Knopfli et al. ................... 29/6.1 |
| 5,622,624 | A | * | 4/1997 | Lauer et al. ................... 210/232 |
| 6,126,707 | A | * | 10/2000 | Pitzen ............................. 55/495 |
| 6,696,169 | B1 | | 2/2004 | Röttger et al. |
| 2003/0085121 | A1 | * | 5/2003 | Powell ..................... 204/298.11 |
| 2005/0060858 | A1 | * | 3/2005 | Mulder ........................... 29/6.1 |

FOREIGN PATENT DOCUMENTS

| FR | 2 421 695 A1 | 11/1979 |
| GB | 1 329 865 A | 9/1973 |
| JP | 2002-292230 A | 10/2002 |
| JP | 2003-24732 A | 1/2003 |
| WO | WO 00/53356 A1 | 9/2000 |

OTHER PUBLICATIONS

National Association of Architectural Metal Manufacturers (NAAMM); EMMA 557-99: *Standards for Expanded Metal Introduction Product Selection Considerations Terminology Manufacturing Process Manufacturing Tolerances Applications*; Chicago, Illinois; 1999 (18 pages).

(Continued)

*Primary Examiner* — Duane Smith
*Assistant Examiner* — Thomas McKenzie
(74) *Attorney, Agent, or Firm* — Christie, Parker & Hale, LLP

(57) ABSTRACT

An expanded metal is provided including a plurality of integral strands defining diamond shapes, each diamond shape having a long dimension as measured from two opposing vertices and a short dimension, generally transverse to the long direction, as measured between two other opposing vertices, such that the long dimension is less than twice the short dimension.

12 Claims, 10 Drawing Sheets

(56) References Cited

OTHER PUBLICATIONS

International Search Report and Written Opinion of the International Searching Authority dataed Feb. 9, 2011, for International Applicaton No. PCT/US2010/050421, Filed Sep. 27, 2010.

Verified English Translation of French Patent No. 2 421 695, Published Nov. 2, 1979, in the name of Le Metal Deploye.

Wallner Tooling\Expac, Inc.; Filter Media Backing; Publication; Rancho Cucamonga, California; 1 page.

* cited by examiner

Prior Art

Prior Art

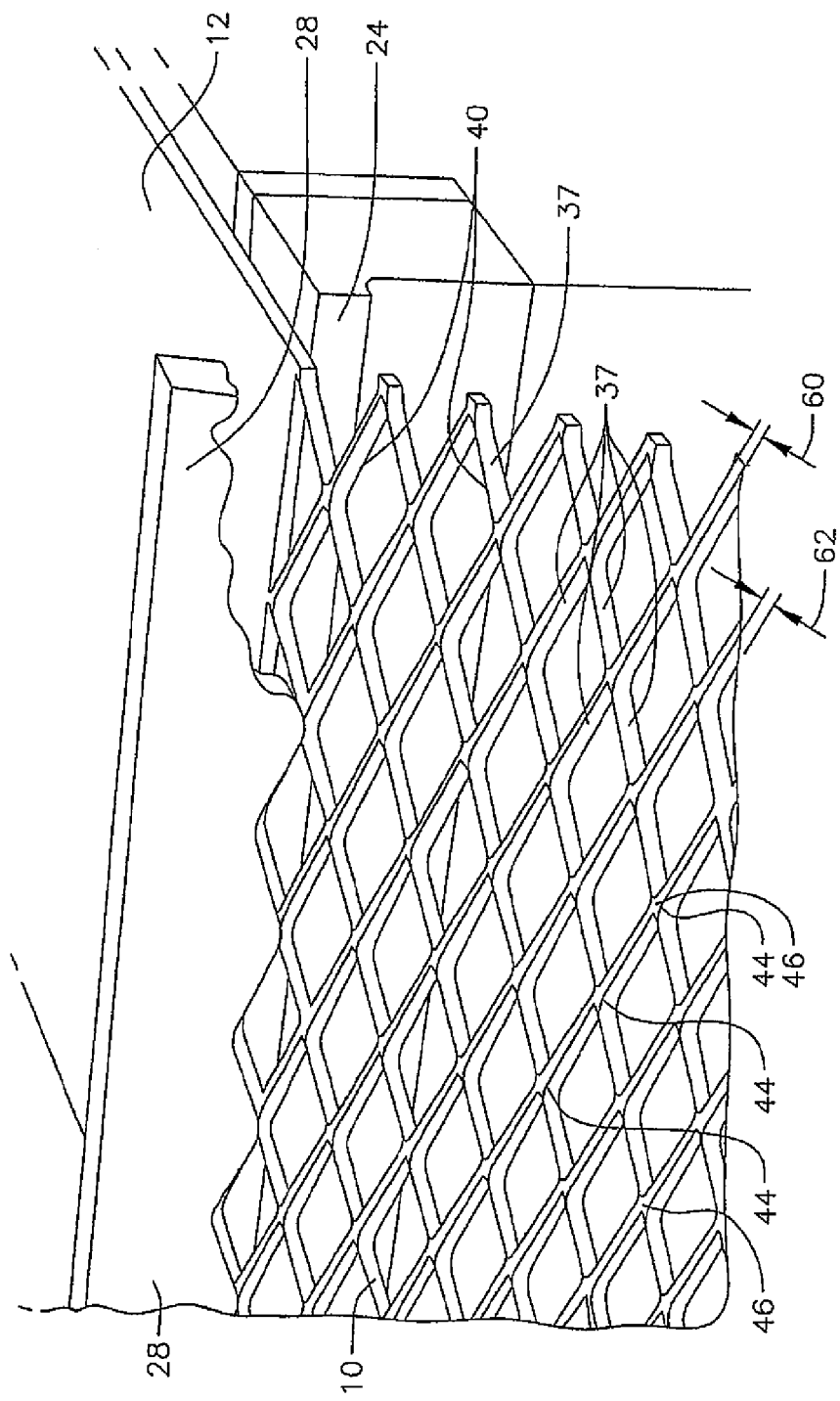

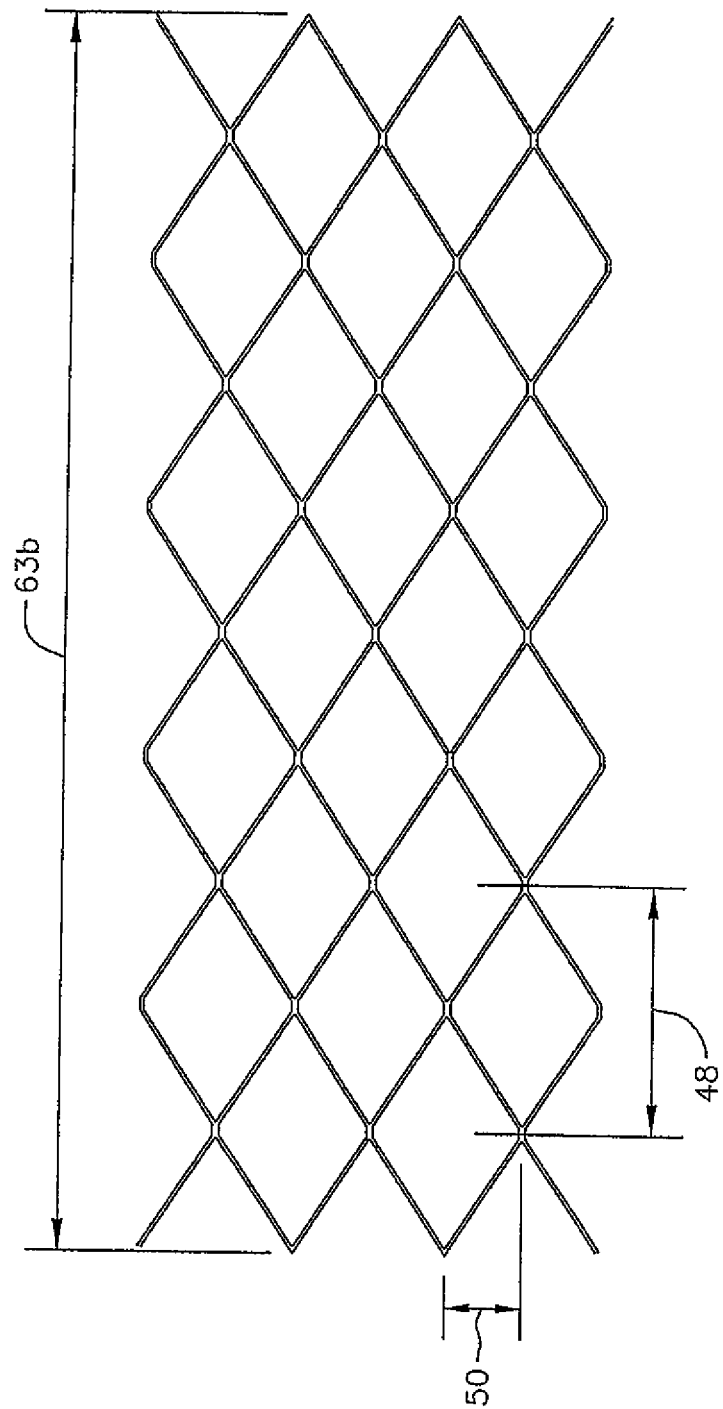

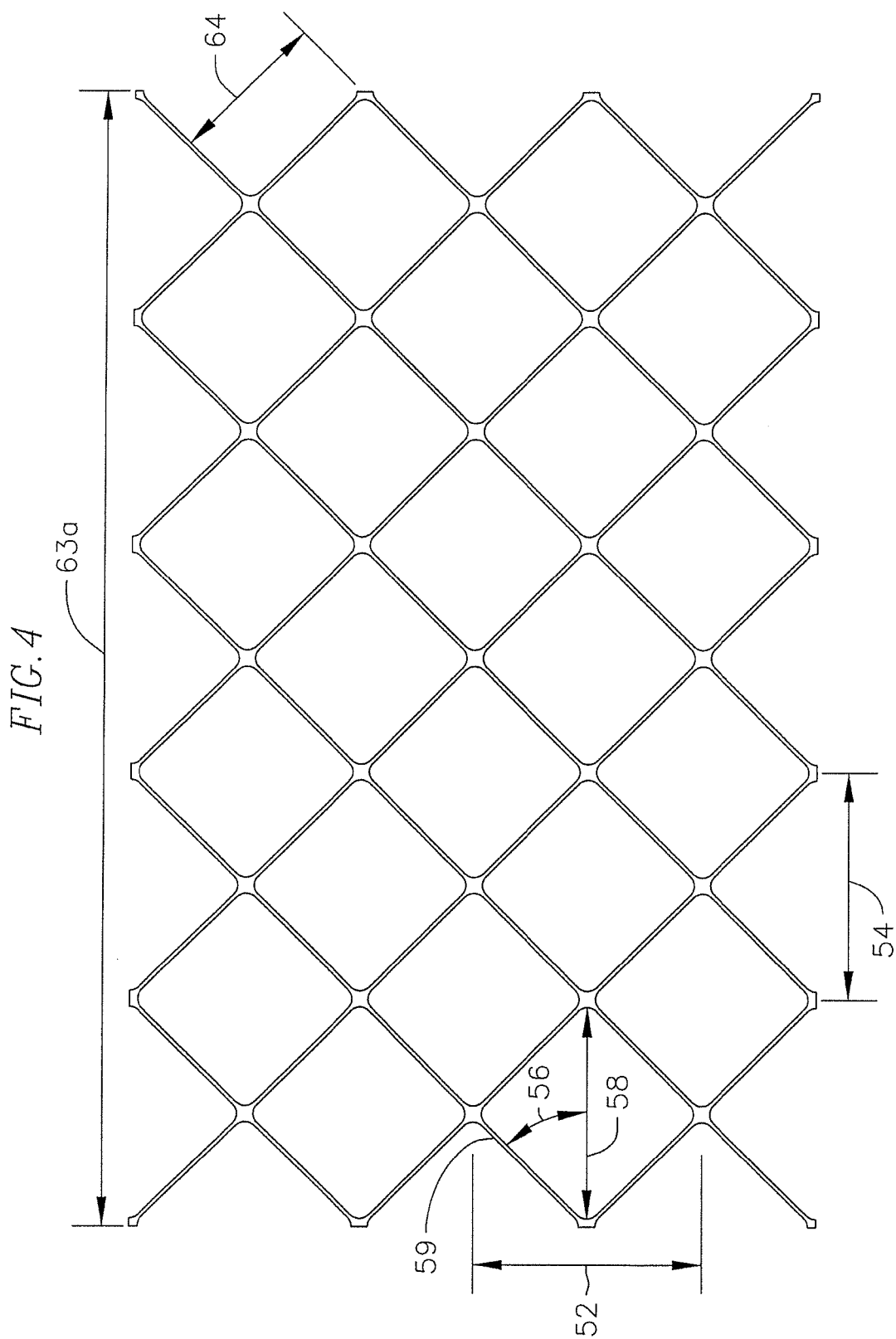

FIG. 7

| BASE PLATE FINISHED WIDTH(IN) | 26° BLADE ANGLE | | 30° BLADE ANGLE | |
|---|---|---|---|---|
| | ORIGINAL WIDTH(IN) | % REDUCTION | ORIGINAL WIDTH(IN) | % REDUCTION |
| 11 | 16.710 | 34.2 | 15.380 | 28.5 |
| 11.25 | 16.710 | 32.7 | 15.380 | 26.9 |
| 13 | 18.705 | 30.5 | 17.375 | 25.2 |
| 13.25 | 18.705 | 29.2 | 17.375 | 23.7 |
| 14.75 | 18.705 | 21.1 | 17.375 | 15.1 |
| 15 | 20.700 | 27.5 | 19.370 | 22.6 |
| 15.25 | 20.700 | 26.3 | 19.370 | 21.3 |
| 16.75 | 22.030 | 24.0 | 20.700 | 19.1 |
| 17.25 | 22.030 | 21.7 | 20.700 | 16.7 |
| 17.5 | 22.030 | 20.6 | 20.700 | 15.5 |
| 18.75 | 24.025 | 22.0 | 21.365 | 12.2 |
| 19 | 24.690 | 23.0 | 22.030 | 13.8 |
| 19.25 | 24.690 | 22.0 | 22.030 | 12.6 |
| 19.5 | 24.690 | 21.0 | 22.030 | 11.5 |
| 20.5 | 26.020 | 21.2 | 24.690 | 17.0 |
| 21 | 26.020 | 19.3 | 24.690 | 15.0 |
| 21.25 | 26.020 | 18.3 | 24.690 | 14.0 |
| 22.75 | 27.355 | 16.8 | 26.020 | 12.6 |
| 23 | 27.355 | 15.9 | 26.020 | 11.6 |
| 23.25 | 27.355 | 15.0 | 26.020 | 10.6 |
| 23.75 | 28.655 | 17.1 | 27.355 | 13.2 |
| 24 | 30.010 | 20.0 | 28.655 | 16.2 |
| 24.25 | 30.010 | 19.2 | 28.655 | 15.4 |
| 24.5 | 30.010 | 18.4 | 28.655 | 14.5 |

| Raw Material Description | Hot Dipped Galvanized, suitable for expanded metal |
|---|---|
| ASTM | 653 Type A FS or DQS material |
| Grade | G 30 or 40 |
| Finish | Min Spangle CTD |
| Base Thickness | .013-.0145 |
| Carbon Content | .04 Max |
| Elongation | 26% or greater |
| Manganese | .25 MAX |
| Rockwell | 50-60 |
| Special Requirements | ROHS Complaint |

| Conventional LWO Finished Size | Conv. Raw Slit LWO | Conv. LWO Red. | Conv. % LWO Red. | Inventive Raw Slit LWO | Inv. LWO Red. | Inv. % Red. |
|---|---|---|---|---|---|---|
| 9.25 | 10.725 | 1.475 | 13.8% | | | |
| 10.875 | 12.720 | 1.845 | 14.5% | | | |
| 11 | 12.720 | 1.720 | 13.5% | | | |
| 11.5 | 12.720 | 1.220 | 9.6% | | | |
| 13 | 14.715 | 1.715 | 11.7% | | | |
| 13.25 | 14.715 | 1.465 | 10.0% | | | |
| 13.5 | 14.715 | 1.215 | 8.3% | | | |
| 14.5 | 16.710 | 2.210 | 13.2% | | | |
| 14.875 | 16.710 | 1.835 | 11.0% | | | |
| 15 | 16.710 | 1.710 | 10.2% | | | |
| 15.5 | 16.710 | 1.210 | 7.2% | | | |
| 15.75 | 17.375 | 1.625 | 9.4% | | | |
| 16 | 17.375 | 1.375 | 7.9% | | | |
| 16.5 | 17.375 | 0.875 | 5.0% | | | |
| 17 | 18.705 | 1.705 | 9.1% | | | |
| 17.25 | 18.705 | 1.455 | 7.8% | | | |
| 17.5 | 18.705 | 1.205 | 6.4% | | | |
| 18.5 | 20.085 | 1.585 | 7.9% | 6.0000 | | 22.0% |
| 18.75 | 20.085 | 1.335 | 6.6% | 6.2500 | | 21.9% |
| 19 | 20.085 | 1.085 | 5.4% | 6.0000 | | 20.6% |
| 19.25 | 20.700 | 1.450 | 7.0% | 4.7500 | | 19.6% |
| 19.5 | 20.700 | 1.200 | 5.8% | 4.6000 | | 19.6% |
| 21.25 | 23.360 | 2.110 | 9.0% | | | |
| 22 | 23.360 | 1.360 | 5.8% | | | |
| 22.5 | 24.690 | 2.190 | 8.9% | | | |
| 22.75 | 24.690 | 1.940 | 7.9% | 27.0375 | 4.1875 | 15.4% |
| 23 | 24.690 | 1.690 | 6.8% | | | |
| 23.25 | 24.690 | 1.440 | 5.8% | | | |
| 23.5 | 25.355 | 1.855 | 7.3% | | | |
| 23.75 | 25.355 | 1.605 | 6.3% | 30.01 | 6.2600 | 20.9% |
| 24 | 25.355 | 1.355 | 5.3% | 30.01 | 6.0100 | 20.0% |
| 24.25 | 26.020 | 1.770 | 6.8% | 30.01 | 5.7600 | 19.2% |
| 24.3125 | 26.020 | 1.708 | 6.6% | | | |
| 24.5 | 26.020 | 1.520 | 5.8% | | | |
| 25.375 | 25.015 | 1.640 | 5.9% | | | |
| 27.5 | 28.680 | 1.180 | 4.1% | | | |
| 28.875 | 30.010 | 1.135 | 3.8% | | | |
| 29 | 30.010 | 1.010 | 3.4% | | | |

| MTDS No | MTD:061209-Revision C | Supersedes | MTD:041309-Revision B |
|---|---|---|---|

| Manager | Title | Approval | Date |
|---|---|---|---|
| Dennis Suzano | CA-Plant Manager | | |
| Rafael Peralta | CA-Floor Supervisor | | |
| Beatrice Dvorak | CA-Quality Assurance Manager | | |
| Johnny Williamson | GA-Production Manager | | |

| Revision | Description | Effective | By |
|---|---|---|---|
| A | new tooling- 28 degree .0625 Fla | Q408 | Management |
| B | new tooling-28 Degree .080 Flat | 4/13/2009 | Management |
| C | Slit Size Change for 18.5, 18.750 & Added finish size 18.5, 22.5 an d23.5 | 6/12/2009 | Management/Production |
| D | Revised slit width on 23.25 | 8/13/2009 | SMT |
| E | New X-Mesh Pattern | 9/14/2009 | Management |

EXPANDED METAL AND PROCESS OF MAKING THE SAME

CROSS-REFERENCE TO RELATED APPLICATION

This application is based upon and claims priority on U.S. patent application Ser. No. 61/246,943, filed on Sep. 29, 2009, the contents of which are fully incorporated herein by reference.

BACKGROUND OF THE INVENTION

Expanded metal has many applications, as for example in air filters, ventilation systems, strainers, etc. Typically, expanded metal is formed by feeding metal sheet or plate (herein after referred to as "base plate") 12 through feeders 14 which is then fed through an expander 16, where it is expanded to form expanded metal 15. The expanded metal is then fed through flattening rolls 18 and into a take-up spool 20, as for example shown in FIG. 1. The feeders 14 are shown in FIG. 1, by way of example, as rolls. The feeder may be any device that feeds the base plate 12 from its spool 22 to the expander. The feeder may also be part of the expander. The expander includes a support base 24 over which is advanced to the base plate 12 (FIGS. 2A, 2B, 2C, and 2D). As the base plate is advanced, a desired strand thickness 26 beyond an edge 29 of the support base (FIG. 2B), a serrated cutting die 28 descends and simultaneously shears, slits and cold forms an entire row 30 of half-diamonds 32, as for example shown in FIG. 2C. The die then ascends and moves over a half-diamond to the right, as for example shown by arrow 3 (or the left in another embodiment) as the base plate is moved forward by another strand thickness beyond the edge of the support base. The die then descends and slits and cold forms another full row 34 of half-diamonds 36, completing a row of full raised diamonds 40 in two strokes, as for example shown in FIGS. 2C and 2D. As can be seen, each diamond is formed from four integral strands 37. The die then descends and returns to its initial position, as shown by arrow 4 in FIG. 2D, and begins to form another row of half-diamonds as the base plate is advanced to another strand width beyond the edge of the support, as for example shown in FIG. 2E. The formed raised expanded metal is then moved by the flattening rolls 18 where it is flattened and further cold worked so as to flatten the expanded material strands 37, especially in the areas where the vertices 44 of the diamonds are integrally connected forming what is commonly referred to as a "bond" 46, which typically has twice the width as the normal strands that exit the expander. The flattening rolls also pinch and pull on the expanded metal typically at a rate faster than the rate of the expanded metal exiting the expander. This causes the expanded metal to stretch by desired amount. In addition, the cutting die 28 also provides resistance against the pulling of the expanded metal by the fattening rolls.

An expanded metal has a "long way of diamond" dimension (LWD) 48, which is along the direction transverse to the direction that the base plate is fed through the expander and a "short way of diamond" dimension (SWD) 50 which is measured along the direction which the base plate is fed through the expander (FIG. 3). Conventional expanded metals have an LWD that is about twice the SWD.

Conventional expanded metals and process by which they are made are described in the "Standards for Expanded Metal Material" published by the National Association of Architectural Metal Manufacturers, NAAMM Standard, EMMA 557-99 The contents of this publication are fully incorporated herein by reference.

When forming filters for residential, commercial use, expanded metal is attached to one side of the filter material and the filter material is then bent into an accordion fashion to faun a pleated filter. With conventional expanded metal, Applicants have discovered that after being pleated, the expanded metal has a tendency to attempt to spring back to its original shape. Thus, consistent pleats are not obtained, as some pleats after being formed spring back more than others. Another problem with filters incorporating conventional expanded metal is that the pleated filter has pleats which do not have consistent heights. As a result, the pleats have an increased chance to collapse during filtering due to the air pressure acting on the filter, resulting in premature failure of the filter. Furthermore, there are less contact points between the pleat peaks and bonds, thus, causing filter fluttering or possible pleat collapsing, which can reduce filter optimal performance. As such, expanded metals that would allow for more consistent pleating of filters and more consistent height pleats are desired.

SUMMARY OF THE INVENTION

In an exemplary embodiment, an expanded metal is provided including a plurality of integral strands defining diamond shapes, each diamond shape having a long dimension as measured from two opposing vertices and a short dimension, generally transverse to the long direction, as measured between two other opposing vertices, wherein the long dimension is less than twice the short dimension. In another exemplary embodiment, the short dimension is equal to the long dimension. In a further exemplary embodiment, at least a portion of the metal is expanded beyond in plastic yield point. In yet another exemplary embodiment, each strand has a width of 0.017 inch.

In a further exemplary embodiment, a filter including a filter medium reinforced with an expanded metal is provided. The filter is pleated and the expanded metal includes a plurality of integral strands defining diamond shapes, each diamond shape having a long dimension as measured from two opposing vertices and a short dimension, generally transverse to the long direction, as measured between two other opposing vertices, wherein the long dimension is less than twice the short dimension. In yet a further exemplary embodiment, the short dimension is equal to the long dimension. In another exemplary embodiment, at least a portion of the metal is expanded beyond in plastic yield point.

In a further exemplary embodiment, a method of forming expanded metal is provided. The method requires feeding a base plate through a cutting die to form an expanded metal, and stretching the expanded metal by at least 15%. In yet a further exemplary embodiment the expanded metal is stretched by at least 30%.

In another exemplary embodiment, a method of forming expanded metal is provide. The method includes feeding a base plate through a cutting die to form an expanded metal, and stretching the expanded metal wherein at least a portion of the expanded metal is stretched beyond its plastic yield point. In one exemplary embodiment, the expanded metal includes a plurality of integral strands defining a plurality of adjacent diamonds, wherein each diamond has four vertices, wherein each strand extends between two vertices, wherein the stretching causes the strands to rotate about the vertices causes at least a portion of at least some of the vertices to stretch beyond their plastic yield point. In one exemplary embodiment, the strands do not stretch beyond their plastic yield point. In another exemplary embodiment, at least a portion of at least some of the strands stretch beyond their plastic yield point. In yet another exemplary embodiment, the expanded metal includes a plurality of integral strands defining a plurality of adjacent diamonds, wherein each diamond has four vertices, wherein each strand extends between two vertices, wherein the stretching causes at least a portion of at least some of the strands to stretch beyond their plastic yield point.

In a further exemplary embodiment, a method of forming expanded metal is provided. The method requires feeding a base plate by a cutting die, shearing portions of the base plate with the cutting die to form an expanded metal including a plurality of integral strands defining a plurality of diamond shapes, each diamond shape having a long dimension as measured from two opposing vertices and a short dimension, generally transverse to the long direction, as measured between two other opposing vertices, and stretching the expanded metal along by an amount sufficient to render the short dimension more than half of the long dimension. In yet a further exemplary embodiment, the method includes stretching the expanded metal by an amount sufficient to render the short dimension equal the long dimension. In one exemplary embodiment, the length of each strand does increase after stretching. In yet another exemplary embodiment, the cutting die includes a plurality of blades, each blade having opposite converging sides extending at opposite angles relative to a common straight line, wherein the angles are each less than 30°. In a further exemplary embodiment, angles are each 26°. In yet a further exemplary embodiment, the angles are each 22°. In another exemplary embodiment, the cutting die includes a plurality of blades, wherein each blade includes a width greater than 1.25 inches. In yet another exemplary embodiment, each blade includes a width of 1.33 inches. In yet a further exemplary embodiment, each blade includes a width of 1.5 inches.

In another exemplary embodiment, a method of forming expanded metal is provided. The method includes feeding a base plate by a cutting die, shearing portions the base plate with the cutting die to form an expanded metal including a plurality of integral strands defining diamond having a long dimension and a short dimension generally transverse to the long direction, the cutting die includes a plurality of blades, each blade having opposite converging sides extending at opposite angles relative to a common straight line, wherein the angles are each less than 30°, and stretching the expanded metal by an amount sufficient to render the short dimension more than half of the long dimension. In yet another exemplary embodiment, each such blade includes a width greater than 1.25 inches. In a further exemplary embodiment, the angles are each 26°. In yet a further exemplary embodiment, each such blade includes a width of 1.33 inches. In one exemplary embodiment, the angles are each 22°. In another exemplary embodiment, each such blade includes a width of 1.5 inches.

In a further exemplary embodiment, a method of forming expanded metal is provided. The method includes feeding a base plate by a cutting die, shearing portions the base plate with the cutting die to form an expanded metal including a plurality of integral strands defining diamonds, each diamond having a long dimension and a short dimension generally transverse to the long dimension, and stretching the expanded metal by an amount sufficient to reduce the long dimension by at least 15%. In yet a further exemplary embodiment, the stretching includes stretching to reduce the long direction by at least 18%. In yet another exemplary embodiment, the stretching includes stretching to reduce the long direction by at least 20%, In a further exemplary embodiment, the stretching includes stretching to reduce the long direction by at least 23%.

BRIEF DESCRIPTION OF THE DRAWINGS

FIGS. 2A, 2B, 2C, 2D and 2E are partial perspective operational views of a cutting die forming an expanded metal.

FIG. 3 is a partial front view of a prior art expanded metal.

FIG. 4 is a partial front view of an expanded metal of an example embodiment.

FIG. 7 is a table depicting finished width an example embodiment expanded metals formed with 26° and 30° angle blades.

FIG. 8 is a table depicting prevent reduction of the long width dimension in an example embodiment expanded metals.

DETAILED DESCRIPTION

Figure 1:
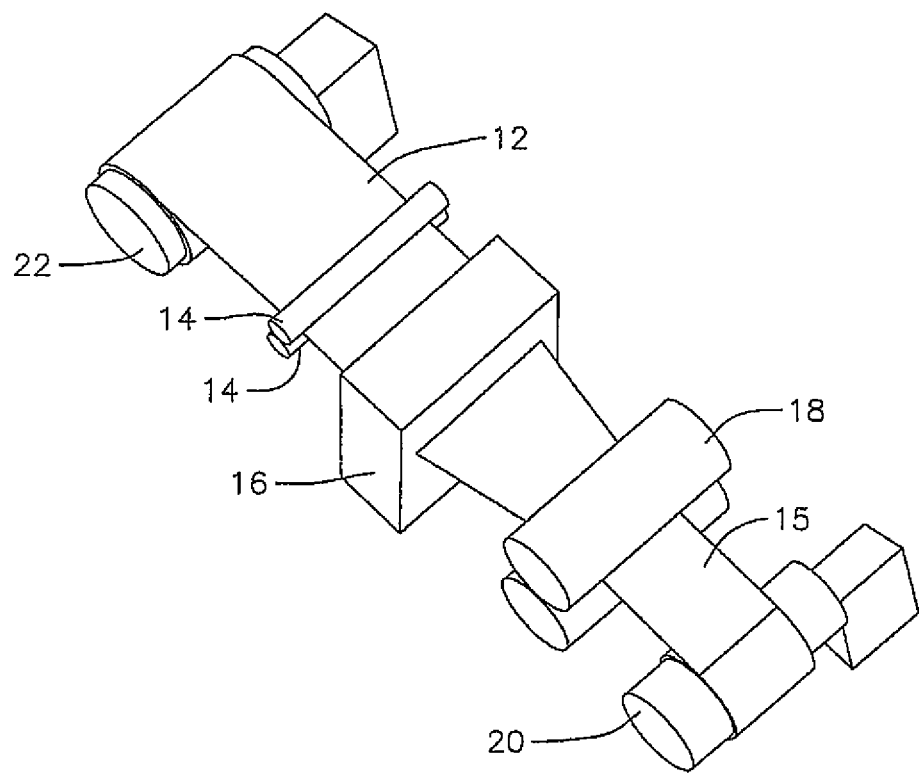
FIG. 1 schematically depicts a process for forming an expanded metal.

Applicants have discovered that they can produce a stronger lighter weight expanded metal which has minimum, or no consistent spring back, or no spring back at all, after bending and thus, when attached to a filter material and pleated, has less tendency to want to return to its original unfolded position. In addition, Applicants have discovered that use of such expanded metal results in pleats having more consistent height, thus having minimal or no high/low variations in the pleat height.

In one exemplary embodiment, Applicants produce such inventive expanded metal by further stretching the expanded metal after it is formed. This is accomplished by increasing the feed rate through the flattening rolls 18 relative to the feed rate existing through the feeder or expander 16. Such further stretching may also be accomplished due to an increase in the pull generated by the flattening rolls against the base plate which is held by the cutting die as the cutting die shears the base plate. As such, as the material gets expanded, it is pulled until it causes the SWD to increase relative the LWD of each diamond. In an exemplary embodiment, the SWD is increased to a level such that SWD is in the range of more than half the LWD to equal to the LWD. During stretching, the SWD increases and the LWD decreases. In an exemplary embodiment, the expanded metal is stretched until the expanded metal increases in length by 15% per linear foot produced. In another exemplary embodiment, the expanded metal is stretched until it increases in length by 25% per linear foot. In yet another exemplary embodiment, the expanded metal is stretched until it increases in length by 28% per linear foot or more and in another exemplary embodiment, by 30% per linear foot or more. In this regard, less metal is used for a given length of expanded metal. In addition, Applicants have discovered that this "over" stretching produces stronger expanded metal.

In an exemplary embodiment, expanded metal of the present invention has an SWD 52 that is almost equal to the LWD 54, as shown in FIG. 4. In an exemplary embodiment, the expanded metal is stretched until the angle 56 between a line 58 joining opposing vertices 37 of a diamond, in a direction transverse to the feed direction through the expander, and a strand 59 is increased by 10% to 30% over the same angle in conventional expanded material. For example, in conventional expanded material, the angle 56 is about 35°, whereas in an exemplary embodiment, the inventive expanded material the angle 56 is about 45°.

In another exemplary embodiment, the expanded metal is stretched such that the LWD of the formed diamonds is reduced in comparison to the LWD created when initially formed, i.e. slit, by the cutting die, by at least 15%. In another exemplary embodiment, the reduction in LWD is at least 18%. In yet another exemplary embodiment, the reduction is at least 20%. Yet in another exemplary embodiment, the reduction is at least 23%. In the conventional expanded metal, the reduction in such LWD caused by the pulling of the flattening rollers tends not to exceed 14.5%. As shown in the table in FIG. 8 are data of LWD reduction for conventional and inventive expanded metals. As can be seen from FIG. 8, in conventional expanded metals, the reduction in LWD, after the expanded metal is pulled, from the initial LWD created by the cutting die, is less than 14.5%, whereas it is at least 18.8% for the inventive expanded metal for which data, has been provided.

Stretching of the expanded material results in the material "necking down", i.e., reducing in width. For example, the width 63a of the inventive expanded metal (FIG. 4) is narrower then the width 63b of a conventional expanded metal (FIG. 3) formed using the same cutting die. Consequently, in order to obtain a desired width of expanded material, a wider base metal needs to be used. Due to the stretching of the SWD dimension, less material is used per linear foot of the inventive expanded metal produced. Thus, the weight per linear foot of the inventive expanded metal for a given width of expanded metal is reduced.

Figure 2A:
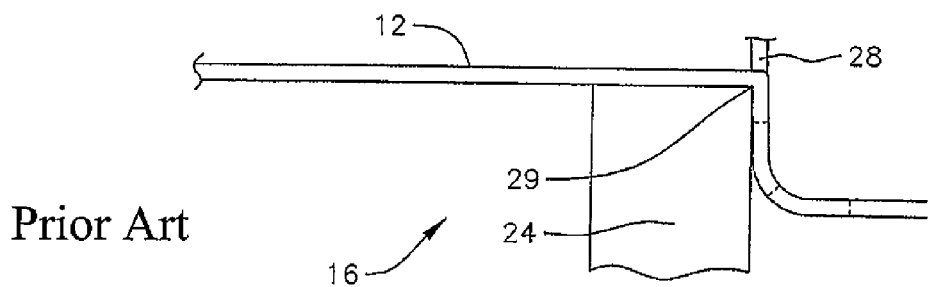
FIG. 2A is a schematically partial cross-sectional view depicting a cutting die shearing base plate for forming an expanded metal.
Figure 2B:
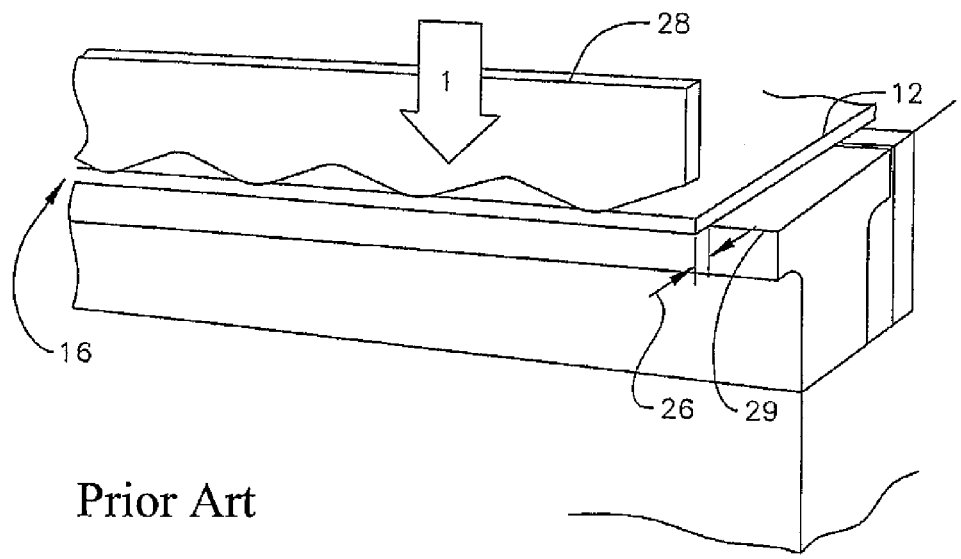
Figure 2C:
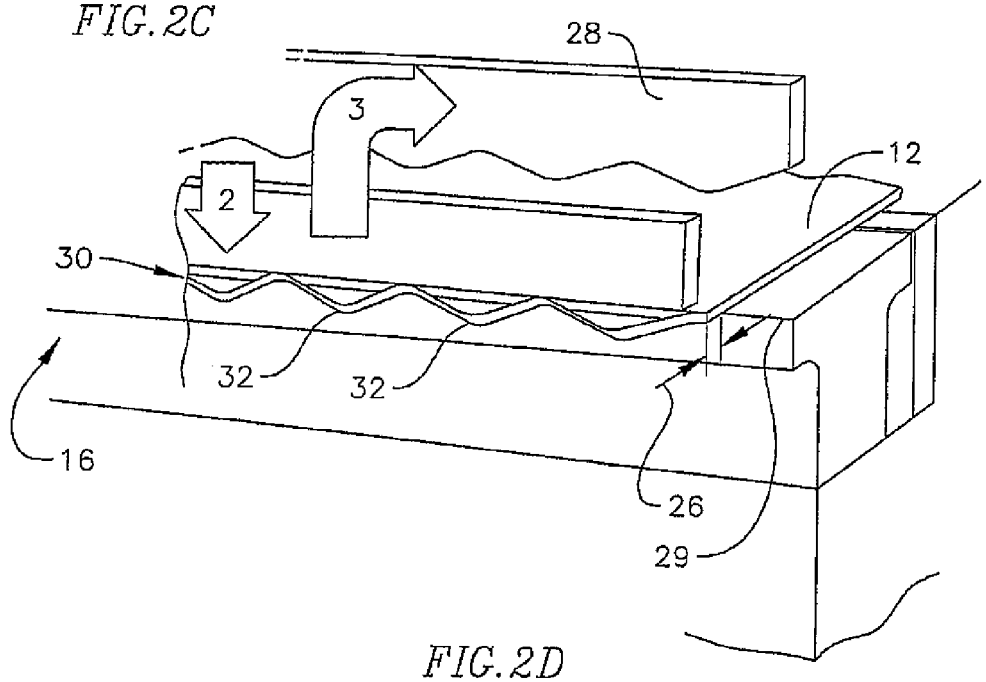
Figure 2D:
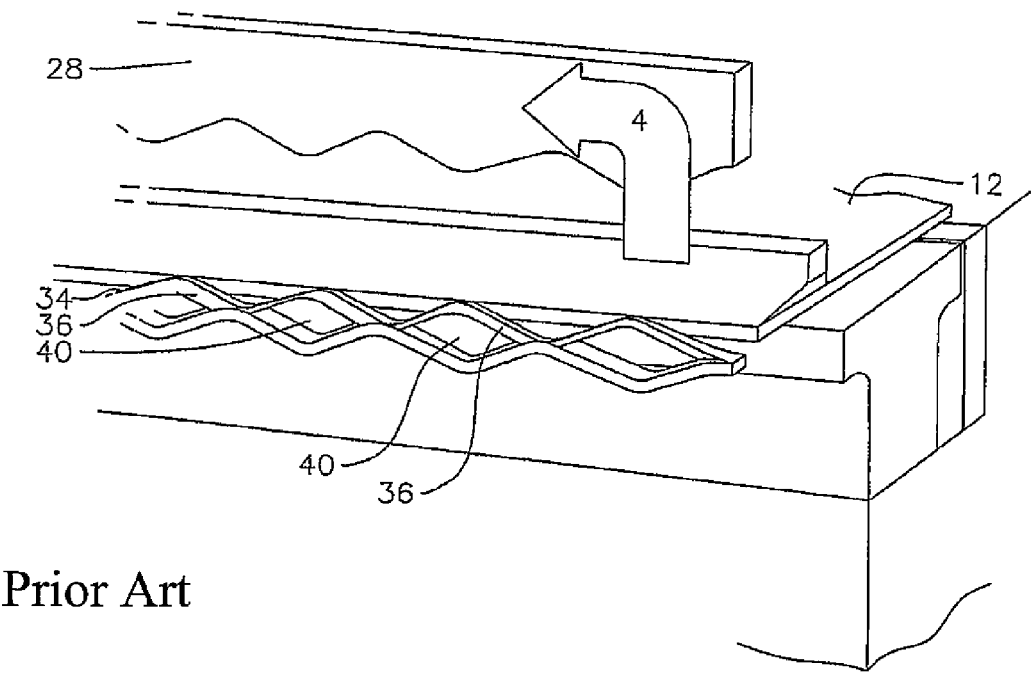

As can be seen, the width 60 of each strand is a function of how much the base plate material 12 is advanced beyond the edge of the support base 24 in the expander prior to being sheared by the cutting die 28 (FIG. 2E). The thickness 62 of each strand is controlled by the thickness of the base plate.

As the expanded material is stretched to form the inventive expanded material and the SWD increases causing the width of the material to decrease. In an exemplary embodiment, the strand length 64 may also increase and the width of each strand may also may decrease. In an exemplary embodiment, the expanded material width decreases, i.e., it necks down, by 15% to 25%. The width of the strands may also be reduced by the same amount. This necking down phenomenon allows for use of thicker base plate which is easier to obtain and more readily available. In other words, you can obtain the desired thickness strand by using thicker base plate 12. In one exemplary embodiment, the thickness of the base plate may be increased by 20%. In addition, by using a thicker base plate, the material may be pressed further by the flattening rolls, further cold working the strands, and thereby increasing the strand length and strength. Moreover, the flattening cold working process causes the width of the strands to increase as they are being flattened.

Figure 5A:
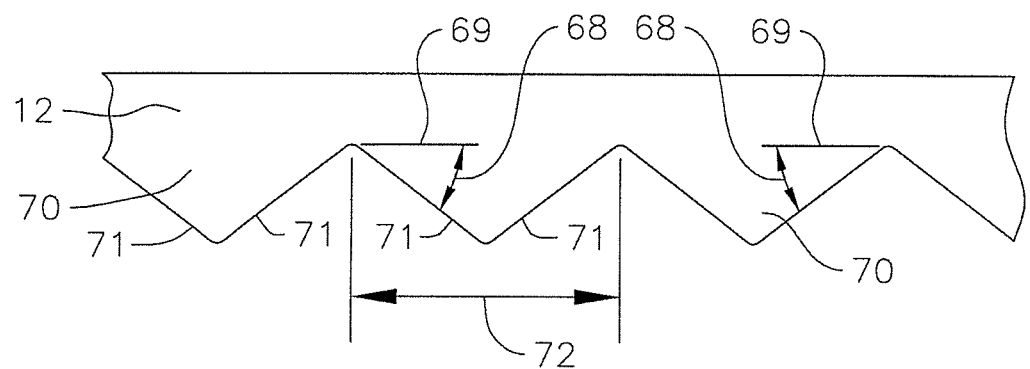
FIGS. 5A and 5B are partial front views of cutting dies used to form an example embodiment expanded metal.
Figure 5B:
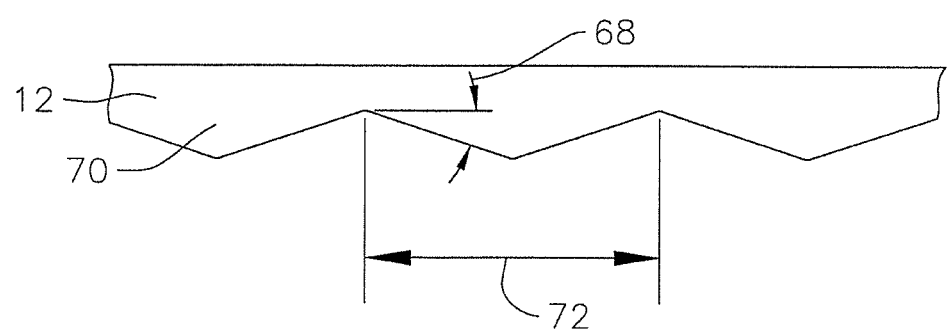

Applicants have also discovered that because of the inventive process of forming the inventive expanded metal by over stretching, they can use cutting dies whose blades are wider, forming a wider LWD prior to being stretched as the stretching will reduce the LWD to a desired level. This provides for another advantage. The dies have blades 70 having oppositely converging sides 71 extending at opposite angles 68 from the horizontal or a common straight line 69. It is difficult to expand less ductile base metal, as for example commercial quality galvanized sheet steel, because the serrated cutting die causes cracks to form in such less ductile material due to the aggressive angle 68 of the cutting die 28 blades 70, measured from the horizontal (or the straight line 69) of the blades 70 (FIG. 5A). With this inventive process, dies having blades 70 having a wider width 72, and thus, a narrower angle 68 may be used. Such cutting blades provide for a less aggressive cut (i.e. shear) as the cutting die is pressed against the base plate thus, not inducing crack growth in the less ductile material. Applicants have discovered that they can also reduce the blade angle 68 by 30% or more, and in one exemplary embodiment by 27% or more, and in another exemplary embodiment by 14% or more. In one exemplary embodiment, the blade angle is reduced from 30° to 26°, and in another exemplary embodiment from 30° to 22°. With these exemplary embodiments, the width of the blades is 1.25 inches when the blade angle 68 is 30°; 1.33 inches when the blade angle is 26°; and 1.5 inches when the blade angle is 22°. In other words, in one exemplary embodiment, the blade width is increased by at least 6%, and in another exemplary embodiment by 20%. Consequently, the lesser the rate of penetration. FIG. 7 depicts a table of expanded metals finished widths according to exemplary embodiments of the present invention formed with blades having an angle 68 of 26° and an angle 68 of 30°. The leftmost column of FIG. 7 depicts the finished widths of the expanded metals of present invention, i.e., the width of expanded metals of the present invention. FIG. 7 also provides the original width of the base plate and the percent reduction in the width of the base plate expanded using the 26° angle and the 30° angle blades during the exemplary embodiment expansion process.

In one exemplary embodiment, the inventive expanded metal produced by the inventive process has a thickness 60 of 30% less than the thickness of a comparable, normally expanded metal. In an exemplary embodiment, the inventive expanded metal strand width is 0.017 inches, whereas it is 0.024 inches for conventional expanded metal.

Figure 6A:
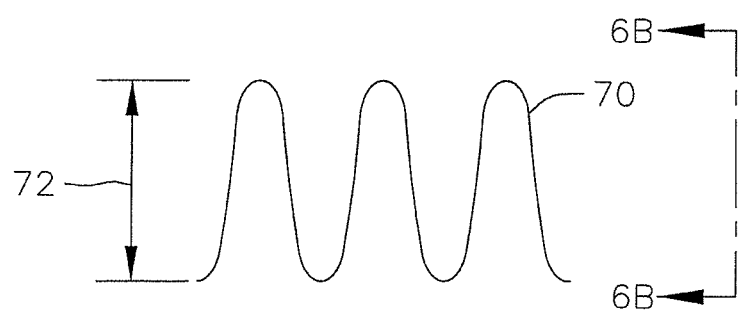
FIG. 6A is an end view of a pleated filter incorporating the expanded metal.
Figure 6B:
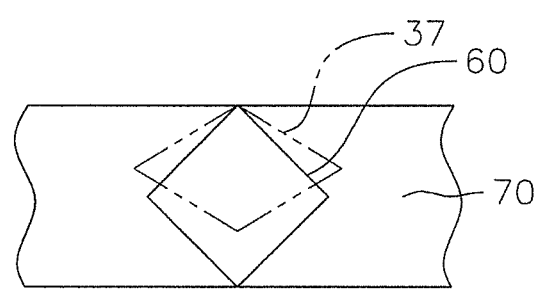
FIG. 6B is a partial plan view, along arrow 6B-6B shown in FIG. 6A, depicting a diamond of an expanded metal of an example embodiment in comparison to a diamond of a conventional expanded metal.

Applicants have discovered that the inventive expanded metal is stronger, has less recoil or spring back after it is bent or pleated when forming a filter 70 (FIG. 6A). In other words, the inventive expanded metal retains its pleated shape and tends not to open. Consequently, it provides for more consistent pleats having a consistent height 72, and thus less high/low variances in the pleat height 72. Applicants believe that one reason for this benefit is that the strands 60, as for example shown in FIG. 6B, of the inventive expanded metal are more vertical in the direction of the pleats than the strands 37 of a conventional expanded metal, as for example shown in dashed line in FIG. 6B. In other words, when bent to form a pleat for use with filter, the strands will be oriented more in the longitudinal direction (i.e., the direction of the expanded metal came out of the die). In an exemplary embodiment, the number of strands in the direction of the pleat are increased by at least 14%. Furthermore, because the inventive expanded metal is stronger, less rigid filtering material may be used to form an expanded metal reinforced filter, with out detrimentally effecting the overall rigidness of such filter, resulting in the reduction of undesirable filter induced pressure drops in a heating, ventilating and air conditioning (HVAC) system or unit. In addition, because with the inventive expanded metal, the area of material (i.e., the area occupied by the strands) for a given length of expanded metal is reduced, the inventive expanded metal provides for larger open (i.e., unobstructed) areas in a filter incorporating such inventive expanded metal, also resulting in the reduction of filter induced pressure drops across such filter.

Applicants also believe that the increase in strength of the inventive expanded metal may be caused by some or all of the inventive expanded material having being stretched beyond its plastic yield point. It may be that only the bonds 46, or some of the bonds, or only the strands, or some of the strands, or any portion of the inventive expanded metal, or the entire inventive expanded metal may have been stretched beyond its yield point. For example, as the expanded metal is stretched beyond its normal limit, the strands rotate about their bonds (much like a pair of scissors) so as to shorten the LWD and increase the SWD. This rotation about the bonds may be sufficient to cause the bonds to rotationally stretch beyond their yield point. In addition, the strands may also be stretched beyond their yield point. This may also be implied by the fact that the inventive expanded metal retains its shape after it is bent or pleated, and does not return to its original shape or has less tendency to return to its original shape. Applicants also believe that the increase strength, when using thicker base plate may also be due to the extra flattening of the material that is accomplished by the flattening rolls for reducing the strand thicker to a desired level, thereby further cold work hardening the inventive expanded metal.

The weight of the inventive expanded metal per linear foot is decreased in comparison to conventional expanded metals having the same width. In one exemplary embodiment, the reduction in weight exceeds 30% and in another exemplary embodiment the reduction in weight is 32%. The increase strength and stability of this material means that less material needs to be used, as for example when forming air filters. As a result, the filter used when forming the inventive expanded metal will have less flow restriction (caused by the inventive expanded metal) than with conventional expanded metal. It is also believed that the inventive expanded metal has increased stiffness. Applicants have also discovered that the inventive expanded metal is more easily uncoiled during the laminating process prior to pleating when forming a filter, and due to its added rigidity, resists necking during such process, and thus, provides for a more consistent pleated width. In addition, with the inventive process a desired linear footage (e.g., 2700 linear feet) of expanded metal is achieved faster reducing the times required to produce a desired length of expanded metal. As can be seen, the inventive expanded metal caused by an increase in the stretching of the expanded metal, provides a myriad of unexpected benefits, at least some of which have been described herein.

The preceding description has been presented with reference to various embodiments of the invention. Persons skilled in the art and technology to which this invention pertains will appreciate that alterations and changes in the described structures and methods of operation can be practiced without meaningfully departing from the principles, spirit, and scope of this invention.

What is claimed is:

1. A filter comprising a filter medium reinforced with an expanded metal, wherein said reinforced filter medium and said expanded metal are pleated, said expanded metal comprising a plurality of integral strands defining diamond shapes, each diamond shape having a first dimension as measured from two opposing vertices and a second dimension, generally transverse to the first dimension, as measured between two other opposing vertices, wherein said expanded metal is formed by slitting a sheet of metal thereby preliminarily expanding said metal, wherein said slit preliminarily expanded metal having been further expanded after slitting along a direction by at least 15% per linear dimensional unit to form said expanded metal, and wherein the second dimension is along the direction of expansion.

2. The filter of claim 1 wherein the second dimension is equal to the first dimension.

3. The filter of claim 1 wherein each vertex is expanded beyond in plastic yield point.

4. The filter of claim 1 wherein the first dimension is less than twice the second dimension.

5. The filter of claim 1 wherein the second dimension is about equal to the first dimension.

6. The filter of claim 1 wherein said strands have been expanded beyond their plastic yield point.

7. The filter of claim 1 wherein the slit preliminarily expanded metal has been expanded along the direction by at least 25% per linear dimensional unit.

8. The filter of claim 1 wherein the slit preliminarily expanded metal has been expanded along the direction by at least 28% per linear dimensional unit.

9. The filter of claim 1 wherein the slit preliminarily expanded metal has been expanded along the direction by at least 30% per linear dimensional unit.

10. The filter of claim 1 wherein after slitting the slit preliminarily expanded metal first dimension is decreased by at least 15%.

11. The filter of claim 1 wherein after slitting the slit preliminarily expanded metal first dimension is decreased by at least 18.8%.

12. The filter of claim 1 wherein after being pleated said expanded metal does not spring back toward its unpleated position.

* * * * *